(12) United States Patent
Peinelt et al.

(10) Patent No.: US 12,459,313 B2
(45) Date of Patent: Nov. 4, 2025

(54) METHOD FOR ASSEMBLING A PNEUMATIC TYRE ON A WHEEL RIM

(71) Applicant: Schenck RoTec GmbH, Darmstadt (DE)

(72) Inventors: Andreas Peinelt, Pfungstadt (DE); Mark Ortwein, Darmstadt (DE); Martin Rogalla, Darmstadt (DE); Philip Beilstein, Lautertal (DE); Alexander Jung, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 18/712,772

(22) PCT Filed: Nov. 21, 2022

(86) PCT No.: PCT/DE2022/100867
§ 371 (c)(1),
(2) Date: May 23, 2024

(87) PCT Pub. No.: WO2023/093938
PCT Pub. Date: Jun. 1, 2023

(65) Prior Publication Data
US 2025/0018752 A1    Jan. 16, 2025

(30) Foreign Application Priority Data

Nov. 24, 2021 (DE) .................. 10 2021 130 854.2

(51) Int. Cl.
*B60C 25/05*      (2006.01)
*B60C 25/138*    (2006.01)
(52) U.S. Cl.
CPC ...... *B60C 25/0515* (2013.01); *B60C 25/0503* (2013.01); *B60C 25/0521* (2013.01);
(Continued)

(58) Field of Classification Search
CPC ............ B60C 25/0503; B60C 25/0512; B60C 25/0515; B60C 25/0521; B60C 25/0533;
(Continued)

(56) References Cited

U.S. PATENT DOCUMENTS 4,621,671 A    11/1986   Kane et al.
5,170,828 A    12/1992   Curcuri
(Continued)

FOREIGN PATENT DOCUMENTS

DE    10 2005 001 212 A1    7/2006
DE    10 2005 030 692 A1    1/2007
(Continued)

OTHER PUBLICATIONS

Translation of WO2010108898 (Year: 2010).*
International Search Report in PCT/DE2022/100867, mailed Feb. 21, 2023.

*Primary Examiner* — Matthew P Travers
(74) *Attorney, Agent, or Firm* — Collard & Roe, P.C.

(57) ABSTRACT

A handling robot includes an articulated arm movable in three directions, which carries a gripper at its free end for gripping and holding pneumatic tires. The pneumatic tire is held on its running surface by the gripper, taken from a provision position and moved to an optional wetting station for wetting the pneumatic tire with lubricant. The wetted pneumatic tire is then moved to an assembly station with a clamping device for releasably holding a wheel rim, which comprises a handling device with an assembly head equipped with assembly tools that can be guided along between the tire bead and the wheel rim flange. Here, the pneumatic tire is mounted on the wheel rim by a coordinated movement of the handling robot and the assembly head.

7 Claims, 5 Drawing Sheets

Figure 1:
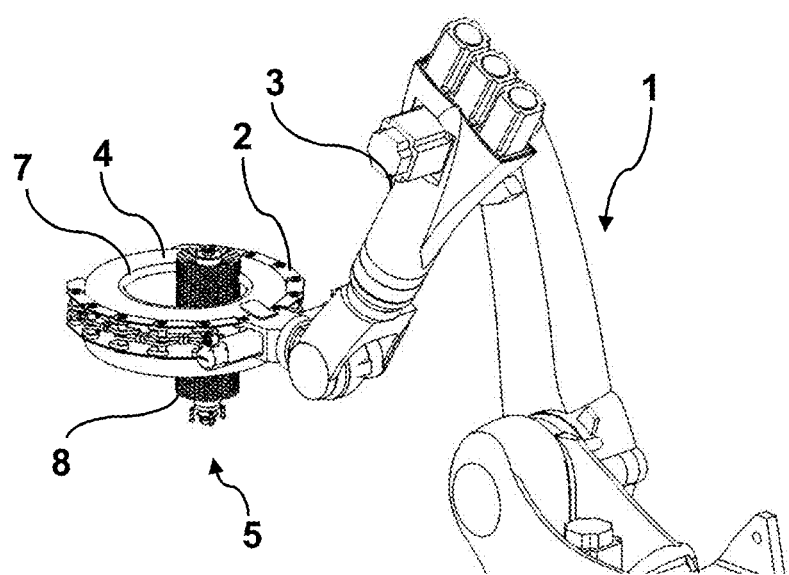

(52) U.S. Cl.
CPC ...... *B60C 25/0533* (2013.01); *B60C 25/0539* (2013.01); *B60C 25/138* (2013.01); *B60C 25/0596* (2013.01)

(58) Field of Classification Search
CPC ............ B60C 25/0539; B60C 25/0596; B60C 25/132; B60C 25/138; Y10T 29/49494
See application file for complete search history.

(56) References Cited

U.S. PATENT DOCUMENTS

| | | |
|---|---|---|
| 7,604,035 B2 | 10/2009 | Lehr et al. |
| 8,661,645 B2 | 3/2014 | Lemser et al. |
| 2007/0000616 A1 | 1/2007 | Rogalla et al. |
| 2008/0066873 A1 | 3/2008 | Zoller |
| 2008/0128092 A1* | 6/2008 | Lehr .................... B60C 25/138 157/1.22 |
| 2008/0128093 A1 | 6/2008 | Rogalla et al. |
| 2012/0267055 A1 | 10/2012 | Rogalla et al. |
| 2018/0215212 A1* | 8/2018 | Kerwin ............... B60C 25/0515 |

FOREIGN PATENT DOCUMENTS

| | | |
|---|---|---|
| DE | 10 2006 057 171 A1 | 6/2008 |
| DE | 10 2011 002 180 B3 | 1/2012 |
| DE | 20 2018 106 191 U1 | 11/2018 |
| EP | 1 738 937 A2 | 1/2007 |
| EP | 1 916 124 A1 | 4/2008 |
| EP | 1 927 483 A1 | 6/2008 |
| EP | 2 388 155 A1 | 11/2011 |
| WO | 99/42309 A1 | 8/1999 |
| WO | 2008/063212 A2 | 5/2008 |
| WO | WO-2010108898 A1 * | 9/2010 ......... B60C 25/0515 |

* cited by examiner

METHOD FOR ASSEMBLING A PNEUMATIC TYRE ON A WHEEL RIM

CROSS REFERENCE TO RELATED APPLICATIONS

This application is the National Stage of PCT/DE2022/100867 filed on Nov. 21, 2022, which claims priority under 35 U.S.C. § 119 of German Application No. 10 2021 130 854.2 filed on Nov. 24, 2021, the disclosure of which is incorporated by reference. The international application under PCT article 21(2) was not published in English.

The invention relates to a method for assembling a pneumatic tyre on a rim with the aid of a handling robot which guides the pneumatic tyre during assembly. A device for carrying out the method is also described.

In the industrial production of vehicle wheels, the rims and tyres that belong together are first brought in separately and then processed one after the other in various production stations until the complete wheel is finished. Here, the rims and tyres must be identified, soaped and assembled according to type. The assembled wheels are then usually automatically filled with air pressure and balanced so that they can be attached to the car. Wheel production of this kind is subject to a high level of quality control, as a poorly manufactured vehicle wheel represents a safety risk, particularly at high speeds, and can have a major impact on the driving behavior of a vehicle. As the individual production stages are partly interdependent, an error in a preliminary stage could lead to the required quality tolerances being exceeded in the finished wheel, making it unusable. Each production station in this production line is therefore designed in such a way that the permissible production tolerance is adhered to as far as possible.

In a method for mechanically assembling vehicle wheels, the rim with the rim dish facing upwards or downwards is held in a horizontal position by means of a clamping device. The pneumatic tyre is placed on the rim at an angle and pushed so close to the rim that the lower section of the lower tyre bead is pressed into the well of the rim, while its upper section protrudes beyond the upper rim flange. Assembly tools are then lowered onto the tyre and the rim from above, which press the tyre sidewall down to the height of the rim well. By rotating the assembly tools around the axis of rotation of the rim, the tyre bead is then continuously pulled over the upper rim flange.

U.S. Pat. No. 5,170,828 A discloses a method for assembling a pneumatic tyre on a drop center rim. According to this method, the pneumatic tyre is placed by means of a conveyor device from above onto a rim held in a clamping device and then conveyed together with the rim into an assembly and filling station. There, the tyre is slipped over the rim by means of an inflation bell, which is moved by a handling device and acts on the tyre beads, and then inflated with the aid of the inflation bell.

U.S. Pat. No. 4,621,671 A describes a machine for assembling pneumatic tyres on drop center rims, in which the rims are conveyed on pallets at a predetermined distance along a conveyor line to two tyre assembling devices located one behind the other.

A device for assembling a pneumatic tyre on a rim is also known from WO99/42309 A1, which comprises a robot with an articulated arm movable in three directions, which can be moved along a movement path which can be selected from a plurality of programmable, predetermined movement paths stored in the memory of a central unit.

DE 10 2006 0571 71 A1 discloses a device for assembling a pneumatic tyre on a rim of a vehicle wheel with a handling robot which has a robot hand movable about several axes with a rotatably drivable flange and a gripper attached to the robot hand, which has a base body and gripper arms movable radially to the central axis of the gripper, which are coupled to a synchronizing device which synchronizes the radial movement of the gripper arms. The synchronizing device has a disc which is rotatably mounted on the base body and can be driven in rotation by a motor, and coupling elements which are attached to the disc and the gripper arms by means of joints and cause a synchronous radial movement of the gripper arms when the disc rotates.

DE 10 2005 030 692 A1 discloses a handling robot for automatically assembling pneumatic tyres on rims. The pneumatic tyres are handled and assembled with the aid of a gripper which is attached to the swivel arm or the robot hand of the handling robot and which can grip and hold the pneumatic tyres in a suitable manner. The pneumatic tyres are gripped by the gripper on the outer circumference in the area of the tread. In addition, the gripper fingers or arms that grip the pneumatic tyres are moved synchronously to each other and apart so that the gripped pneumatic tyres always reach a defined central position in relation to the gripper and thus also in relation to the robot hand.

DE 20 2018 106 191 discloses a device for gripping and holding a tyre on its outer circumference, comprising a handling device with an articulated arm that can be moved in several spatial directions and has a gripper with two gripper arms at its free end. The multi-link gripper arms consist of segments which are in active contact with each other via synchronization means in such a way that the movement of one gripper segment leads to the movement of another gripper segment and the gripping movement of the gripper arms takes place in a plane transverse to the tyre axis, so that the gripper segments can be brought into contact with the outer circumference of the tyre with their contact surfaces. This means that tyres with different outer diameters can be gripped on the outer circumference without blocking the side surfaces of the tyres for further processing, with the gripper arms or their gripper segments moving radially in a synchronized manner.

WO 2008/063212 A2 describes a tyre assembly system in which several robots work together and perform defined tasks, so that, for example, a rim robot moves the rim to a soaping station and sets it down after soaping, while a tyre robot performs the same process with the tyre. An assembly robot is used to assemble the wheel, during which the tyre and the rim are mounted.

DE 10 2011 002 180 B3 discloses a method for assembling a pneumatic tyre on a well-base rim. Here, the pneumatic tyre is gripped on the tread by means of a gripper arranged on a handling device and the first tyre bead is slid over the rim by a controlled movement of the gripper. The gripper is then released from the pneumatic tyre and the tyre is moved into an initial position for assembling the second tyre bead by means of actuators. By rotating the gripper around the axis of the rim, assembly tools arranged on the gripper are guided along the rim, whereby the second tyre bead is slid over the rim.

The problem with the known devices is that several assembly stations with several handling devices are required, which is particularly cost-intensive and complicates the maintenance of the systems.

The invention is based on the task of providing a method for the automatic assembling of pneumatic tyres in which the number of handling devices is reduced without negatively influencing the automation.

The problem is solved by the features of claim 1. Preferred embodiments are described in the dependent claims.

According to the invention, the task is solved by providing a method for assembling a pneumatic tyre on a drop-center rim of a vehicle wheel, in which the pneumatic tyre is gripped on the tread in a provision position by means of a gripper arranged on an articulated arm of a handling robot that can move in three directions, the tyre is brought up to the rim held in a clamping device and, by means of a controlled movement of the gripper holding the pneumatic tyre, the first tyre bead facing the rim is slipped over a rim flange of the rim, that the second tyre bead is mounted with the aid of a handling device having an assembly tool, which, during the movement of the handling robot, in particular along a circular path, guides the assembly tool along a circular path on the rim flange and the second tyre bead is thereby completely slipped over the rim flange, the movement of the handling robot being coordinated with that of the handling device. The handling robot can perform a predetermined or freely programmable positioning and movement of the tyre, whereby this positioning and movement is coordinated with the movement of the handling device with the assembly tool, particularly when assembling the second tyre bead, so that the movements are coordinated. For example, the tyre held by the handling robot can be tilted in such a way that the task or activity undertaken by the assembly tool of the handling device is simpler or easier and can be carried out more quickly, safely and efficiently.

The method according to the invention has the advantage that, due to the coordinated movement of the handling robot and the handling device, numerous tools are no longer required and the assembly, i.e. the handling of the tyre, can basically be carried out by a single handling robot. This means that the handling robot takes over the role of all tyre assembly tools from the classic assembly machine, so that tools such as front/rear tyre lifters, tyre pushers and hold-down devices are no longer required and a simple assembly system is provided. Advantageously, the handling robot thus takes over the function of all tyre manipulation tools not located on the assembly head. Above all, the tyre is held on its tread by the handling robot during the entire assembly process. This enables high conveyor speeds and correspondingly short cycle times and avoids incorrect positioning of the tyre when transferring from one conveyor to the next. The assembly system can also be easily expanded, as additional stations can be added.

For certain types of tyres, it can be advantageous if the pneumatic tyre is wetted with a lubricant before assembly in order to simplify assembling. In this respect, it can be advantageous if a pneumatic tyre already wetted with lubricant is provided, in particular in a provision position, and is gripped by the gripper arranged on the articulated arm of the handling robot at the tread and brought up to the rim held in a clamping device and, by a controlled movement of the gripper holding the pneumatic tyre, is slipped over a rim flange of the rim with the first tyre bead facing the rim, in that the second tyre bead is mounted with the aid of a handling device having an assembly tool which, during the movement of the handling robot, in particular along a circular path, guides the assembly tool along a circular path on the rim flange and the second tyre bead is thereby placed completely over the rim flange, the movement of the handling robot being coordinated with that of the handling device.

It may also be preferred that the soaping of the pneumatic tyre, in particular its rim bead, is also carried out by the handling robot, namely after the handling robot has removed the pneumatic tyre from the provision position and before the lubricant-wetted pneumatic tyre is brought to the clamping device. A method for assembling a pneumatic tyre on a drop-center rim of a vehicle wheel is thus preferred, in which the pneumatic tyre is gripped at the tread in a provision position by means of a gripper arranged on an articulated arm of a handling robot that can move in three directions, conveyed by the handling robot to a wetting station for wetting the tyre beads with lubricant and moved along an application device for the lubricant in the wetting station with the tyre beads, the tyre wetted with lubricant is then moved by the handling robot to the rim held in a clamping device and, by means of a controlled movement of the gripper holding the pneumatic tyre, the first tyre bead facing the rim is slipped over a rim flange of the rim, that the second tyre bead is mounted with the aid of a handling device having an assembly tool, which, during the movement of the handling robot, in particular along a circular path, guides the assembly tool along a circular path on the rim flange and the second tyre bead is thereby completely slipped over the rim flange, the movement of the handling robot being coordinated with that of the handling device. The method according to the invention makes it possible to carry out further process steps, which were previously carried out by separate handling devices or manually, by the handling robot and to integrate them into the process. The tyre assembly systems are thus simpler, the costs and maintenance effort are reduced and the cycle times can be lowered.

In one embodiment, it is provided that the pneumatic tyre is placed on the rim by the handling robot for assembling the first tyre bead in a position inclined to the rim, in which the axis of rotation of the pneumatic tyre forms an angle with the axis of rotation of the rim, in such a way that a section of the rim flange penetrates into the opening of the first tyre bead and the tyre bead comes to rest in the region of this section of the rim flange at a point of the drop center of the rim and that the tyre bead is then slipped over the rim flange by reducing the inclination of the pneumatic tyre relative to the rim. This makes it easy to fit the first bead using only the handling robot, which is associated with lower costs and shorter cycle times.

It is preferred that the first tyre bead is mounted with the aid of a handling device having an assembly tool, the movement of which is coordinated with that of the handling robot, so that during the movement of the handling robot the assembly tool is guided along a circular path on the rim flange and the first tyre bead is thereby completely fitted over the rim flange. For certain tyre types, it is advantageous to use assembly tools for assembling the first bead. However, this step can also be carried out by a coordinated movement of the handling robot and the assembly head. It has been shown to be advantageous here if the inclination of the pneumatic tyre by the handling robot also takes place along a circular path, whereby this circular path has a larger radius than that of the assembly head or the assembly tool. As a result, the assembly tool and the inclination of the pneumatic tyre, in particular the lowest point of the pneumatic tyre, move synchronously on their circular paths and are located one behind the other radially to the longitudinal axis of the rim. The assembly tool and the inclination of the pneumatic tyre, in particular the lowest point of the pneumatic tyre, are therefore advantageously located radially one behind the other on their circular paths.

It can be advantageous if the application device comprises a rod-shaped, stationary brushing device that can be wetted with lubricant and the handling robot swivels the tyre around the brushing device. Applying the lubricant using a brush around which the pneumatic tyre is swiveled has proven to be an efficient and cost-effective wetting method.

According to a further proposal of the invention, it may be provided that the pneumatic tyre is deformed during assembly by the handling robot or the handling device in such a way that the tyre bead to be mounted assumes an oval shape. To make this possible, the gripper holding the pneumatic tyre can be controlled in such a way that the gripper performs a defined asynchronous clamping movement. Alternatively, the oval shape of the pneumatic tyre can be achieved by a radial movement of the assembly head, in particular its tool.

A device for carrying out the method comprises a handling robot with an articulated arm movable in three directions, which carries at its free end a gripper for gripping and holding pneumatic tyres and with an assembly station with a clamping device for releasably holding a rim, which comprises a handling device with an assembly head equipped with assembly tools which can be guided along between the tyre bead and the rim flange, the assembly station being arranged in the working area of the handling robot. The handling robot can receive pneumatic tyres already wetted with lubricant. Alternatively, the handling robot can bring the pneumatic tyre to a classic wetting station, in which the pneumatic tyre is wetted with lubricant by hand, for example. In a preferred embodiment, a wetting station with an application device that can be wetted with lubricant is provided, in particular in the working area of the handling robot, whereby the handling robot guides the pneumatic tyre to be wetted to the application device. Here, the handling robot also takes over the soaping of the pneumatic tyre by picking up the pneumatic tyre from a loading station, performing a coordinated soaping movement in the wetting station and then guiding the wetted pneumatic tyre to the rim held in an assembly station.

The handling robot, which can also be referred to as an assembly robot within the meaning of the invention, comprises an articulated arm which can be moved in three directions and which carries at its free end a gripper, preferably movable relative to the articulated arm, for gripping and holding pneumatic tyres. The gripper is designed in such a way that the tyres can be gripped at their outer circumference and held in a force-locking manner by radial clamping. Preferably, the tyre is held at three or more points distributed around the circumference and located on the tyre tread. The device according to the invention comprises an assembly station with a clamping device for holding the rim during tyre assembly. Furthermore, in one embodiment, a wetting station with an application device, in particular a brush, for wetting the tyre beads with a lubricant can be arranged in the working area of the handling robot. Preferably, the wetting station is located directly at the end of a conveyor device for feeding the tyres to be mounted. It may also be possible to integrate the wetting station into the end section of the conveyor section of said conveyor system.

The handling robot advantageously takes over the task of the usual tyre assembly tools, whereby it can be advantageous if the gripper of the handling robot comprises at least one hold-down device that presses the upper tyre bead essentially at the level of the drop center of the rim.

In order to coordinate or synchronize the control of the handling robot and the handling device, in particular the assembly head, a synchronization device can be provided, which can, for example, be a component of the program-controlled handling robot and the handling device and is controlled by a control unit connected to these in a data-exchanging manner. Relevant data such as tyre types etc. can be entered via the control unit and the device according to the invention can be controlled. For this purpose, the control unit can have input means, such as a touch screen.

Figure 9:
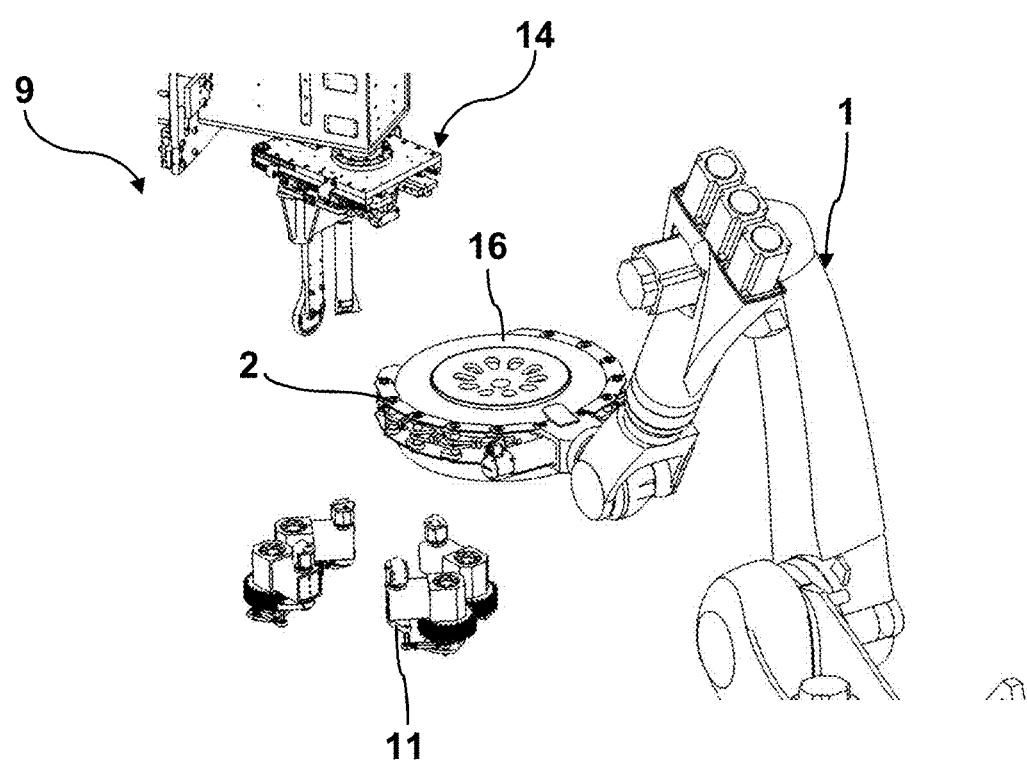

The invention is explained in more detail below with reference to an embodiment of the invention, which is shown in the drawing. It shows FIG. 1 a handling robot with pneumatic tyres at the wetting station, FIG. 2 a handling robot with wetted pneumatic tyres at the assembly station, FIG. 3 an assembly of the first bead, FIGS. 4-6 assembly of the first bead using the assembly head, FIG. 7, 8 an assembly of the second bead with the aid of the assembly head and FIG. 9 further transportation of the mounted wheel.

FIG. 1 shows a handling robot with pneumatic tyres at the wetting station. The handling robot 1 has a gripper 2, which is attached to the free arm of an industrial robot, with an articulated arm 3 having several axes of movement, by means of which the gripper 2 can be moved in three spatial directions. Such a gripper 2 is known, for example, from DE 20 2018 106 191 U1, the content of which is explicitly included. However, the method according to the invention is not limited to certain embodiments of a gripper 2. Rather, the grippers known in the prior art, with the aid of which a pneumatic tyre can be held on its tread, are suitable for the method according to the invention. Preferred are grippers 3 that allow synchronous movement of the gripper elements. As an alternative to a synchronous movement of the gripper elements, an asynchronous movement can also be provided if, for example, the tyre is to be pressed into an oval shape by the gripper. In this case, the movement of the gripper elements should also be centered so that the center of the tyre oval is in the center of the gripper.

In addition, the gripper 2 is connected to the articulated arm 3 so that it can rotate about two axes. The handling robot 1, which is also referred to as an assembly robot in the sense of the invention, has several independent drives which can be controlled by a programmable control device and enable the gripper 2 to be moved in a precise position. The gripper 2 grips a pneumatic tyre 4 to be mounted, e.g. from a conveyor device not shown in FIG. 1, on its outer circumference, whereby the pneumatic tyre 4 is radially tensioned and held in a force-locking manner. The conveyor device for feeding the pneumatic tyre 4 to be mounted is preferably located in the working area of the handling robot 1.

In one embodiment, a wetting station 5 can be located in the working area of the handling robot 1, which serves to wet the tyre beads, namely the lower and upper bead 6, 7, with a lubricant before assembly, in order to facilitate the assembly process. This means that the process of soaping the pneumatic tyre 4 can easily be included in the process according to the invention. Here, too, the pneumatic tyre 4 is held or moved by the handling robot 1, so that the pneumatic tyre 4 is held on its running surface by the handling robot 1 during the entire assembly process and additionally during the soaping process. Alternatively, the handling robot 1 can take a soaped pneumatic tyre 4, i.e. a pneumatic tyre 4 wetted with lubricant, from a provision position and feed it to the further assembly process, whereby the soaping of the pneumatic tyre 4 is carried out by conventional means, such as manually or using a separate device.

The wetting station 5 comprises an application device 8 for applying the lubricant, which can be designed as a brush, for example. The wetting station 5 can comprise a table with a flat tray, in the center of which the cylindrical, fixed brush is arranged. Alternatively, a spray nozzle can be provided as an application station 8. In the following, the application of lubricant will be illustrated using the brush as an application device 8. Liquid lubricant, for example soap solution, is conveyed from the tub to the top of the brush through a supply line in the center of the brush by means of a pump arranged below the tub, whereby the brush is impregnated with lubricant. The pneumatic tyre 4 held on its tread by the gripper 2 is moved over the application device 8, in particular the brush of the wetting station 5, with the aid of the handling robot 1 and then lowered so far that the brush penetrates into the openings of the two tyre beads 6, 7. During this process, the tyre 4 is essentially centrally aligned with the brush, whose diameter in the case shown here is smaller than the inner diameter of the beads 6, 7. The pneumatic tyre 4 is then moved until the beads 6, 7 touch the brush at one point. The pneumatic tyre 4 and gripper 2 are now moved once or several times around the axis of the brush on a circular path, whereby the brush slides along the tyre beads 6, 7 and wets them completely with lubricant. After wetting, the pneumatic tyre 4 is re-centered in relation to the brush and then removed upwards from the wetting station 5.

Figure 2:
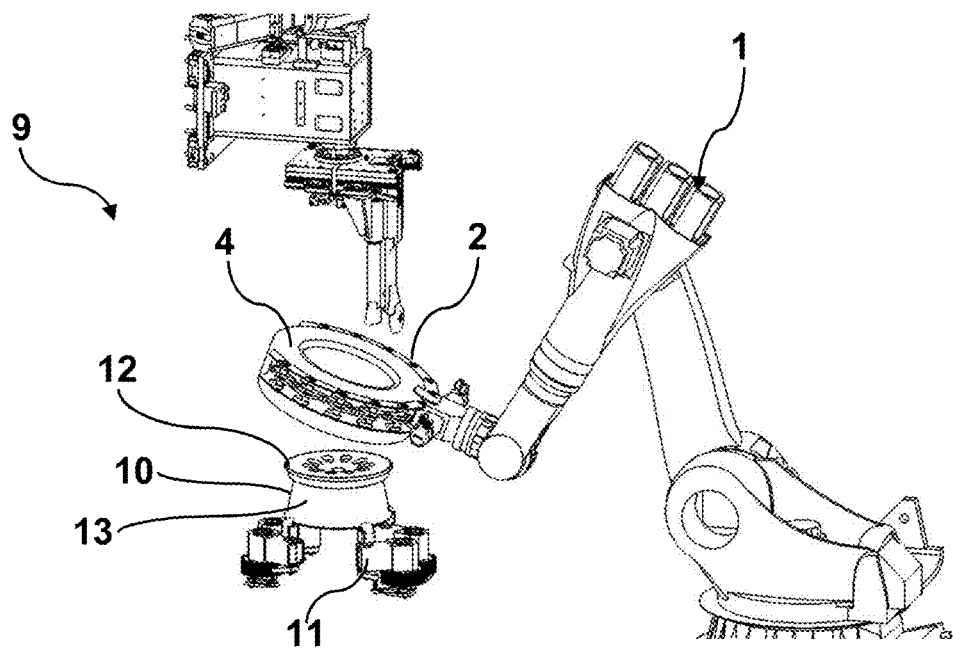
Figure 3:
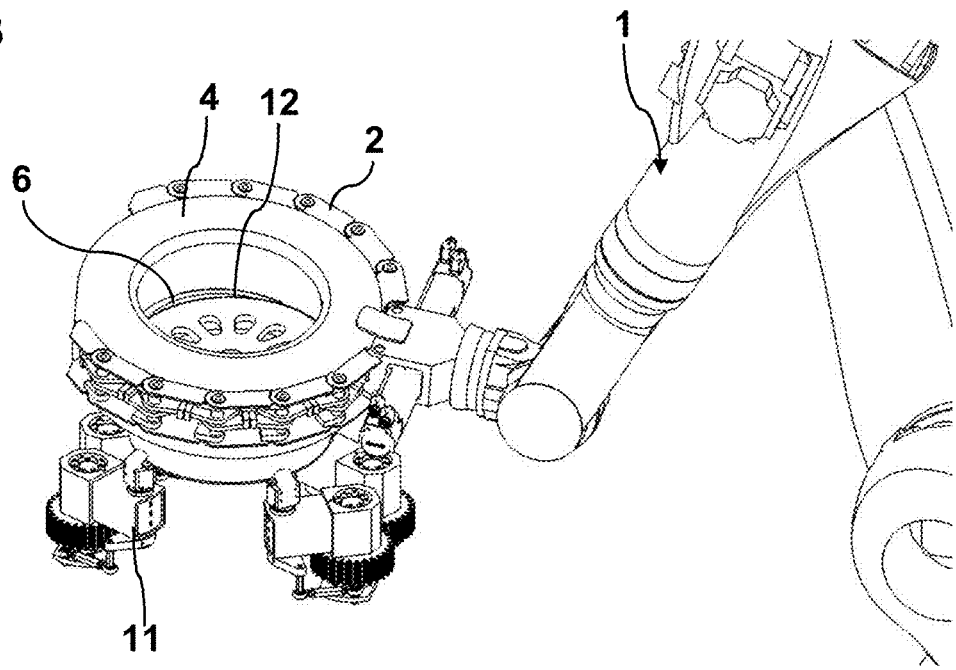

FIG. 2 shows a handling robot with a wetted pneumatic tyre at the assembly station and FIG. 3 shows the assembly of the first bead. An assembly station 9 is located in the working area of the handling robot 1. In the assembly station 9, the pneumatic tyre 4 wetted with lubricant is mounted on a clamped rim 10 with the aid of the handling robot 1. The rim 10 matching the tyre 4 is fixed in a horizontal position by means of a suitable clamping device 11.

The handling robot 1 moves the pneumatic tyre 4 from its original horizontal position to an inclined position relative to the horizontal position. The pneumatic tyre 4 is then lowered onto the rim 10 and the lower bead 6 is slid over the upper rim flange 12 with the lowest point first, essentially in a radial direction, whereby this partially penetrates into the opening of the tyre bead 6 and the tyre bead 6 rests with its lowest point against the drop center 13 of the rim 10. Once this state is reached, i.e. the pneumatic tyre 4 reduces its inclination relative to the rim 10, the radial movement of the tyre 4 relative to the rim 10 is ended and the tyre 4 is rotated around the point of contact between the tyre bead 6 and the drop center 13 in such a way that the tyre 4 returns to an approximately horizontal position. In this case, the tyre bead 6 is slid completely over the rim flange 12.

Figure 4:
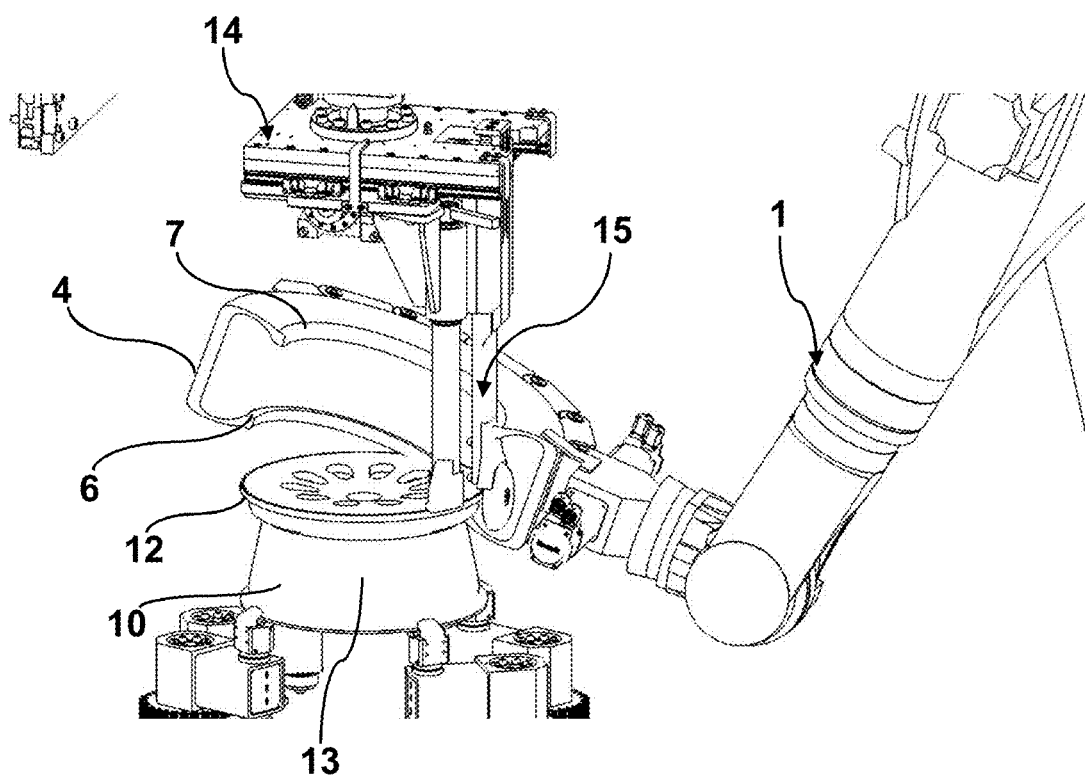
Figure 5:
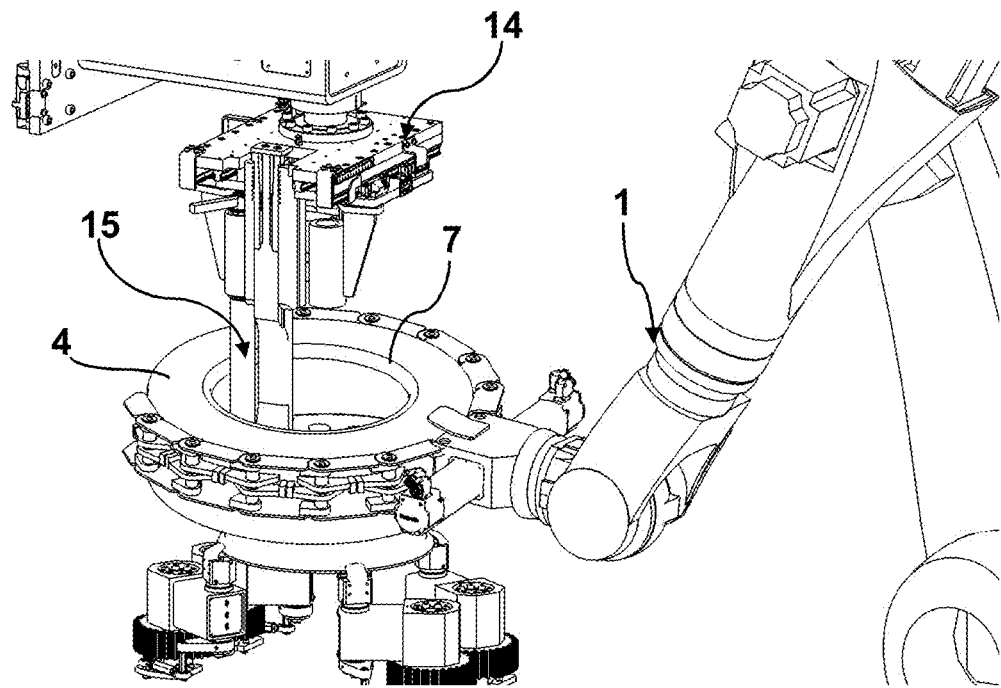
Figure 6:
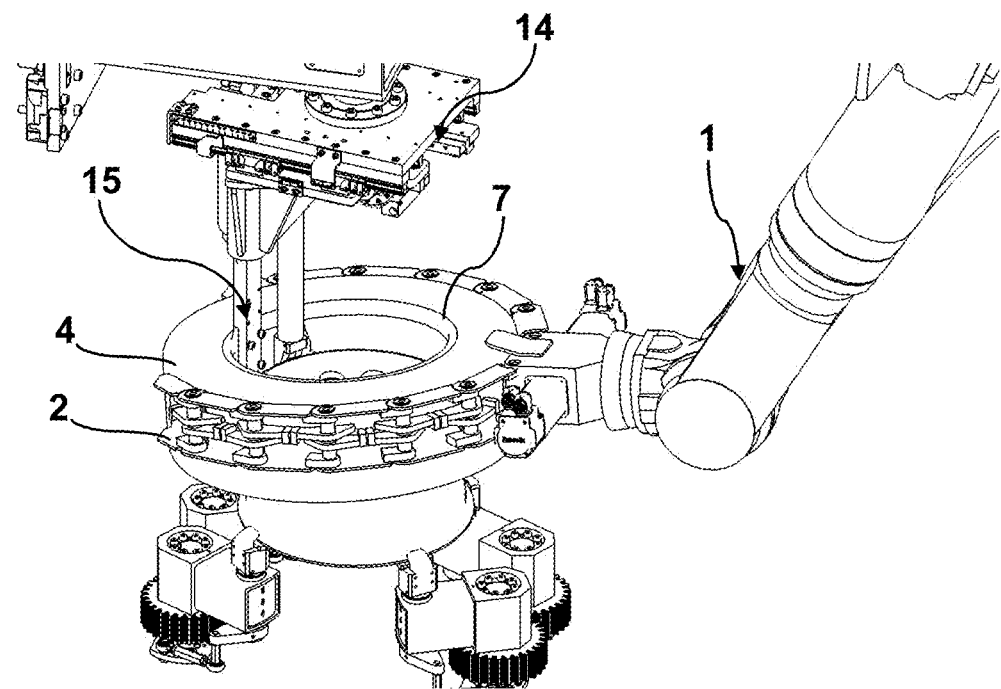
Figure 7:
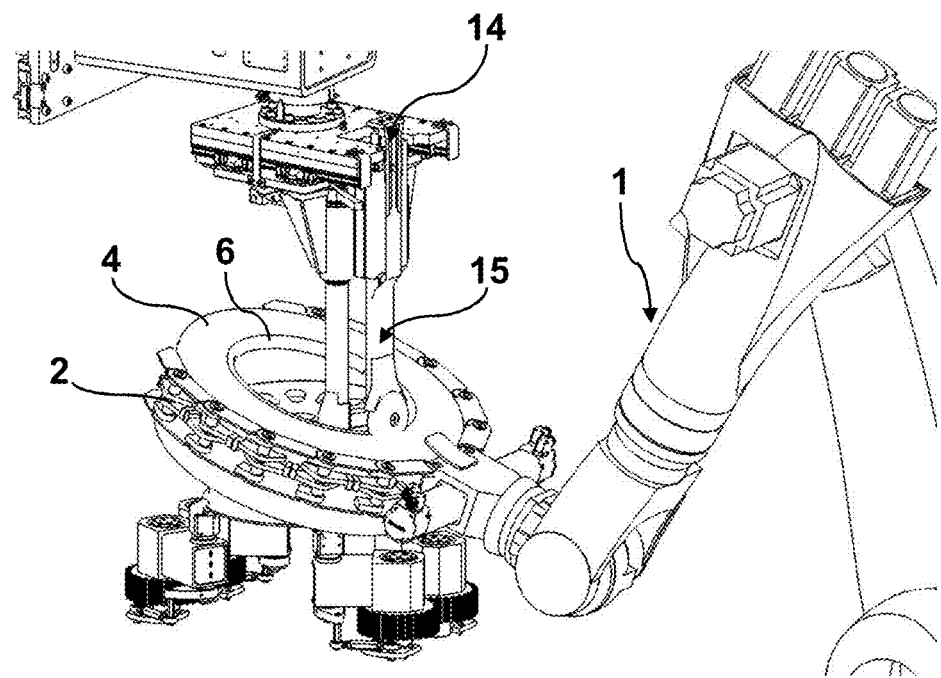
Figure 8:
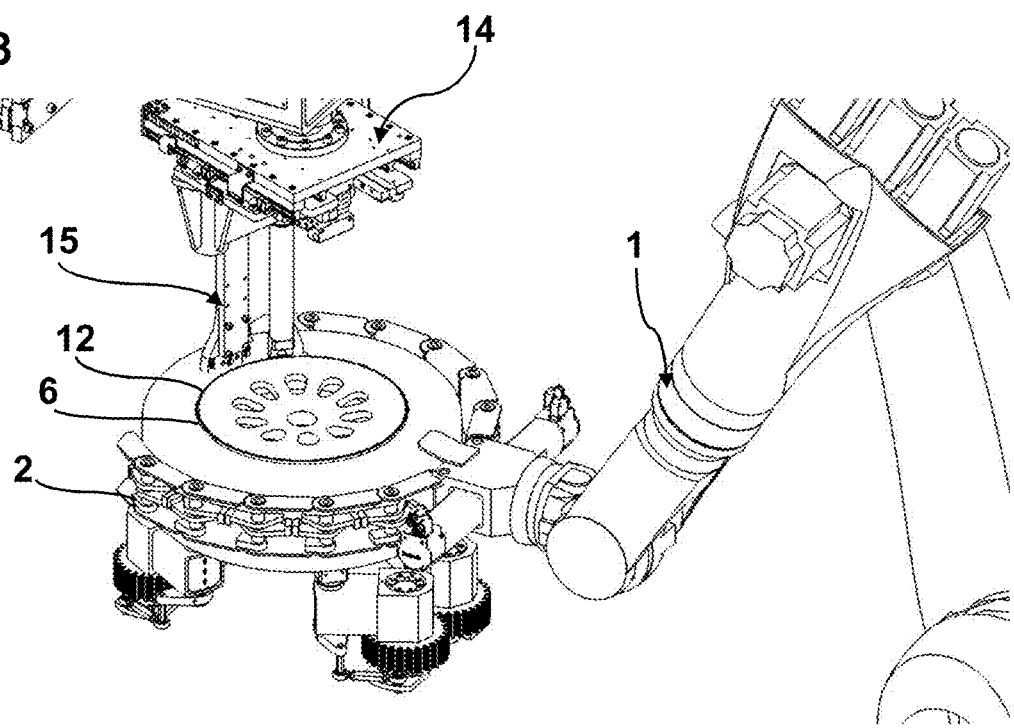

FIGS. 4-6 show the assembly of the first bead using the assembly head. For certain pneumatic tyres 4, assembly with an assembly tool is advantageous and possibly easier. For such a tyre assembly, the first bead 6 can be mounted according to one embodiment with the aid of the assembly head 14. The assembly head 14 is arranged above the rim 10 and, in particular, coaxially to the axis of the rim 10 and can be moved in various directions by means of a handling device not shown. The handling device can be designed as a simple assembly station with linear drives and rotary drives. However, it is also possible for the handling device to be designed as an industrial robot with the assembly head and tool arranged at its free end.

Assembly tools 15 are movably arranged on the assembly head 14 and comprise, in particular, a bead deflector and an assembly roller. The position of the assembly tools 15 can be adjusted in a radial direction in order to adapt to different rim and tyre diameters. The arrangement of additional elements, for example a tracking roller, can also be provided. It may also be advantageous to arrange a second set of assembly tools diametrically opposite the first.

To initiate the assembly of the first bead 6, the tool 15 is moved through the opening of the upper bead 7 into the working position at the edge of the rim 10. As soon as the tool 15 has reached the position shown in FIG. 4, the assembly head 14 is rotated clockwise around the axis of the rim 10. The tool 15 moves along the edge of the rim 10, with its bead deflector continuously pushing the lower bead 6 over the edge of the rim 10 and the pressure roller following the bead deflector pressing the bead 6 down towards the center of the rim 10. At the same time, the handling robot 1 tilts the held pneumatic tyre 4 synchronously with the rotation of the assembly head 14. Since the radius of the circular path of the assembly tool 15 is smaller than the radius of the circular path followed by the inclination of the pneumatic tyre 4, the inclined pneumatic tyre 4, in particular the lowest point of the pneumatic tyre 4, is located close to the assembly tool 15, i.e. the assembly tool 15 and the inclination of the pneumatic tyre 4, in particular the lowest point of the pneumatic tyre 4, performed by the handling robot 1 essentially move radially to the longitudinal axis of the rim 10 and synchronously along their respective circular paths. This considerably simplifies the assembly of the pneumatic tyre 4. The movement of the assembly head 14 and that of the handling robot 1 are coordinated-both perform a synchronized movement along a circular path, whereby the handling robot 1 supports the activity of the assembly head 14 or its tool 15 through the quasi-moving inclination of the pneumatic tyre 4. A correspondingly programmable control unit can be connected to the control of the assembly head 14 or its synchronization device and the control of the handling robot 1 or its synchronization device in a data-exchanging manner. The control unit of the handling robot 1 can precisely control the movement of the gripper 2 with pneumatic tyre 4 using the data entered via the control unit for the size and position of the rim 10 or the pneumatic tyre 4 and coordinate it with the movement of the assembly head 14. The assembly of the first tyre bead 6 is essentially completed when either the assembly head 14 has reached a previously defined point on the circular path, corresponding sensors detect the complete assembly of the first bead 6 or the pneumatic tyre 4 is in a horizontal position again.

To mount the second, upper tyre bead 7, the assembly tool 15 can be brought into an initial position after assembling the first tyre bead 6, in which it is positioned close to the edge of the rim 10. By further lowering the assembly tool 15, the second bead 7 is pressed over the upper rim flange 12 at one point and comes into contact with the drop center 13 of the rim 10. The lowering of the assembly tool 15 is accompanied by an inclination of the pneumatic tyre 4 by the gripper 2 of the handling robot 1. The inclination is only carried out to such an extent that the lower bead 6 is prevented from slipping out of the drop center 13 of the rim 10 on the opposite side of the tyre 4. The inclination of the tyre 4 then takes place along a circular path, and the movement of the assembly head 14 or the assembly tool 15 also takes place along a circular path. Here too, the movements of the pneumatic tyre 4, i.e. its quasi-moving inclination, and those of the assembly head 14 or its tool 15 are synchronized. The fact that the radii of the circular paths are different means that the lowest point of the pneumatic tyre 4 and the tool 15 can be guided close to each other, so that both are behind each other radially in relation to the longitudinal axis of the rim.

The assembly of the second tyre bead 7 is only completed when the tool 15 has reached its starting position again, in particular after an almost full or full circular movement. The clamping device 11 then releases the rim 10 so that the handling robot 1 can convey the mounted wheel 16 consisting of rim 10 and tyre 4 to a subsequent processing station, for example a tyre inflation station.

Advantages of the method or device according to the invention include the fact that the handling robot 1 holds the tyre 4 during the entire assembly process, thereby eliminating errors during tyre transfer. Assembly is simplified and cycle times are reduced.

The invention claimed is:

1. A method for assembling a pneumatic tire on a drop center rim of a vehicle wheel, the pneumatic tire comprising a tread, the method comprising:
   gripping the pneumatic tire on the tread in a provision position using a gripper arranged on an articulated arm of a handling robot which can move in three directions,
   bringing the tire up to the rim held in a clamp, and,
   slipping, by a controlled movement of the gripper holding the pneumatic tire, a first tire bead facing the rim over a rim flange of the rim,
   wherein a second tire bead is mounted with the aid of a handling device having an assembly tool, which, during the movement of the handling robot, guides the assembly tool along a circular path on the rim flange and the second tire bead is thereby completely slipped over the rim flange, the movement of the handling robot being coordinated with that of the handling device, and
   wherein the pneumatic tire is conveyed by the handling robot into a wetting station for wetting the first and second tire beads with lubricant and is moved in the wetting station with the first and second tire beads along an application device comprising a brush or a spray nozzle for the lubricant, and
   wherein the movement of the handling robot and the movement of the handling device are coordinated in such a way that the pneumatic tire, held by the handling robot, is tilted along a first circular path and the assembly tool is simultaneously moved along a second circular path that is radially offset from the first, the movements being synchronized by a common controller such that the lowest point of the pneumatic tire and the assembly tool are guided in a defined radial relationship to the longitudinal axis of the rim.

2. The method according to claim 1, wherein the pneumatic tire is placed on the rim by the handling robot for assembling the first tire bead in a position inclined with respect to the rim, in which an axis of rotation of the pneumatic tire forms an angle with an axis of rotation of the rim, in such a way that a penetrating section of the rim flange penetrates into an opening of the first tire bead and the first tire bead comes to rest in a region of the penetrating section of the rim flange at a point of the drop center of the rim,
   and wherein the first tire bead is subsequently slipped over the rim flange by reducing the inclination of the pneumatic tire relative to the rim.

3. The method according to claim 1, wherein the first tire bead is mounted with the aid of the handling device having the assembly tool, the movement of which is coordinated with that of the handling robot, so that during the movement of the handling robot the assembly tool is guided along a circular path on the rim flange and the first tire bead is thereby completely placed over the rim flange.

4. The method according to claim 1, wherein the application device comprises a rod-shaped, stationary brushing device comprising the brush which can be wetted with lubricant, and the handling robot swivels the tire around the brushing device.

5. The method according to claim 1, wherein the pneumatic tire is rotated by the handling robot about a contact point between the drop-center and the first or second tire bead when an inclination of the pneumatic tire relative to the rim is reduced.

6. The method according to claim 1, wherein the pneumatic tire is deformed during assembly by the handling robot or the handling device in such a way that the first or second tire bead to be mounted assumes an oval shape.

7. The method according to claim 1, wherein, after assembling the pneumatic tire on the rim, the handling robot transfers the vehicle wheel to a conveyor device transporting the vehicle wheel away.

* * * * *